Sept. 8, 1931.  W. F. WHITAKER  1,822,328
CORN HARVESTER CONSTRUCTION
Filed Oct. 19, 1929  2 Sheets-Sheet 1
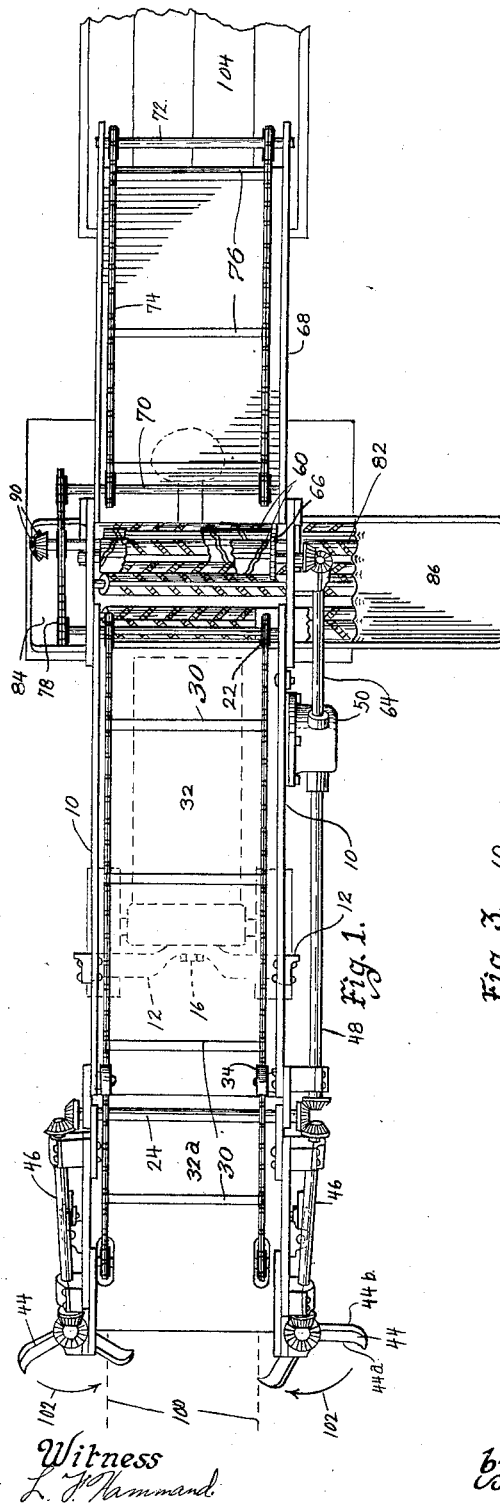
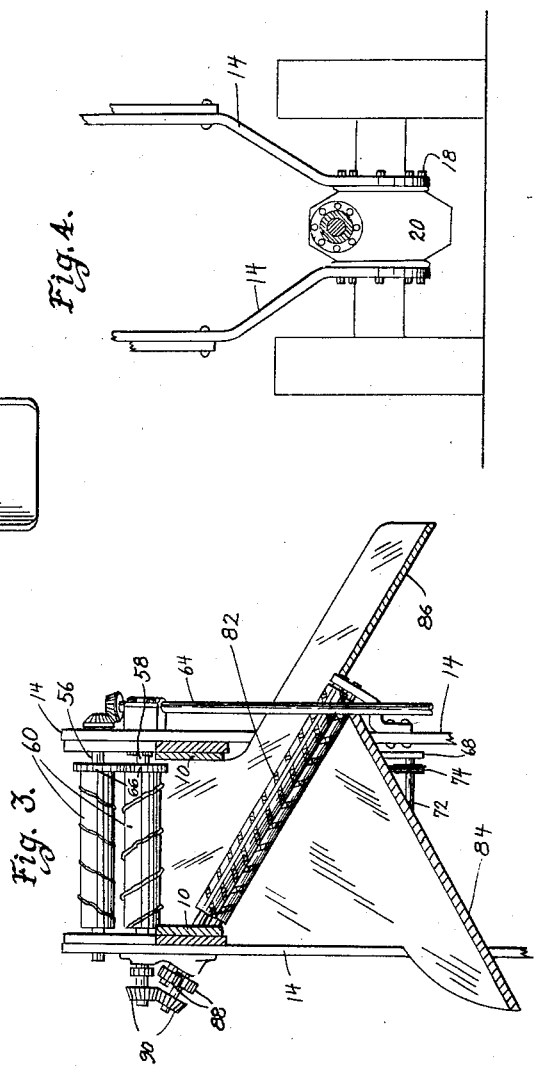
Inventor
Willard F. Whitaker
by Bair, Freeman & Sinclair
Attorneys Sept. 8, 1931.  W. F. WHITAKER  1,822,328
CORN HARVESTER CONSTRUCTION
Filed Oct. 19, 1929  2 Sheets-Sheet 2
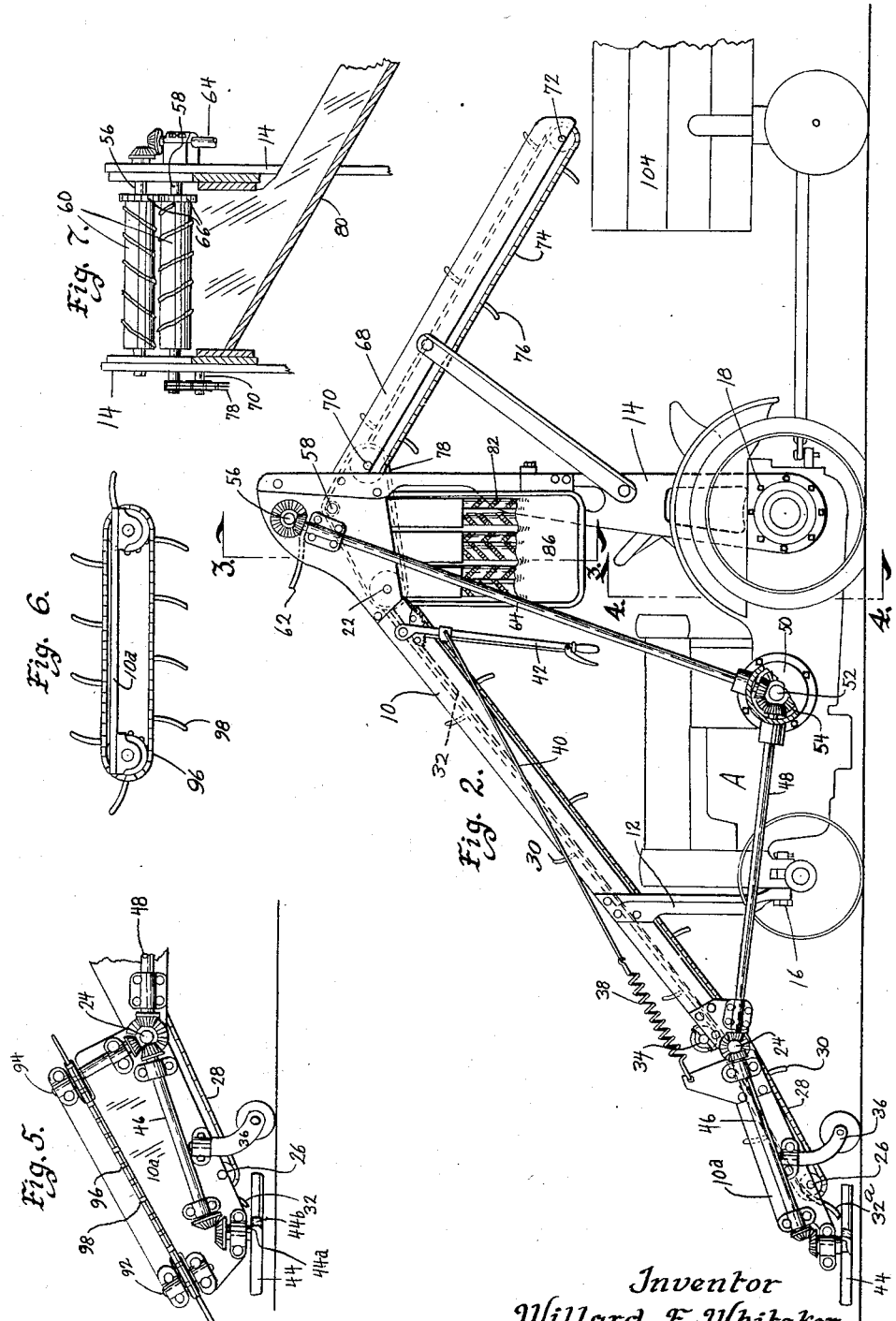
Inventor
Willard F. Whitaker
by Bair, Freeman & Sinclair
Attorneys
Witness
L. F. Hammand.

Patented Sept. 8, 1931

1,822,328

UNITED STATES PATENT OFFICE

WILLARD F. WHITAKER, OF FAIRFIELD, IOWA

CORN HARVESTER CONSTRUCTION

Application filed October 19, 1929. Serial No. 400,875.

The object of my invention is to provide a corn harvester construction, which is simple, durable and comparatively inexpensive to manufacture.

More particularly it is my object to provide a corn harvester construction consisting of corn stalk cutting and gathering mechanism to be supported directlp in front of a tractor and elevating mechanism with snapping and husking rolls supported directly above the tractor, so that all side draft is eliminated and a row of corn need not be broken down when starting to pick a field of corn with the device.

Another object is to provide a corn harvester structure consisting of an elevating conveyor above the tractor and a pivoted portion extending forwardly and downwardly from the front of the tractor and terminating in a corn cutting and gathering mechanism.

Another object is to provide snapping rolls with a space between such rolls and the upper end of the elevating conveyor, whereby the ears of corn snapped from the stalks may drop downwardly and to further provide husking means below such space to receive the ear corn and husk it.

Another object is to provide means for conducting the stalks of corn into a wagon or baler pulled behind the tractor.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a plan view of my structure showing it mounted on a tractor.

Figure 2 is a side elevation of the same.

Figure 3 is a sectional view of the line 3—3 in Figure 2, illustrating the relation between the snapping rolls, husking rolls and the chute arrangement in the structure.

Figure 4 is a sectional view on the line 4—4 of the Figure 2 and is a continuation of the lower end of Figure 3.

Figure 5 is a side elevation of a modified form of the forward end of the structure.

Figure 6 is a plan view of one of the side members of such front end.

Figure 7 is a view similar to Figure 3 showing a modified form in which the husking rolls are omitted.

On the accompanying drawings I have used the reference character A to indicate generally a suitable tractor on which my structure may be mounted.

The structure itself consists of a pair of side frames 10 supported by a yoke 12 and by the upright members 14.

The yoke 12 may be mounted on an elongated king-pin 16 at the forward end of the tractor A and may be attached thereto in any suitable manner. The upright members 14 may be secured by cap screws 18 to the rear axle housing 20 of the tractor A.

Adjacent the upper end of the side frames 10, I journal a conveyor shaft 22. A drive shaft 24 is journaled adjacent the lower ends of the side frames 10. Extensions 10a are pivotally mounted on the drive shaft 24 and carry a conveyer shaft 26. Conveyer chains 28 are mounted on sprockets secured to the conveyor shafts 22 and 26. Gathering fingers 30 are carried by the conveyer chains 28. Extending between the side frames 10 is a conveyer bottom 32 and between the side frames 10a is a conveyor bottom 32a, which over-laps the bottom 32.

A pair of rollers 34 are provided to keep the upper stretch of the conveyor chain 28 adjacent the conveyor bottoms.

The extension frames 10a are partially supported by a pair of caster wheels 36 and partially supported by a spring 38, which is connected by a rod 40 with a control lever 42.

Each frame 10a rotatably supports a stalk cutter 44, which have sharpened forward edges 44a and rear edges 44b curved upwardly (as best shown in Figure 5).

A drive shaft 46 is provided for each cutter 44 and is driven from the drive shaft 24 by a bevel gear connection.

Thus the forward end of the device may oscillate upwardly and downwardly upon the shaft 24 as a pivot, and yet an operating connection is provided between the shaft 24 and the cutter 44 at all times.

A power shaft 48 extends from a gear housing 50 adapted to be secured to the tractor A at the power take-off position. The power take-off shaft 52 of the tractor is provided with a bevel gear 54 for driving the power shaft 48. Adjacent the upper end of the harvester snapping rolls 60 are secured by means of snapping roll shafts 56 and 58. A sheet metal guard 62 serves to guide the corn stalks between the snapping rolls 60.

For driving the snapping rolls 60, I provide a power shaft 64 driven from the bevel gear 54 within the gear housing 50. A bevel gear connection serves to operatively connect the snapping roll shaft 56 with the power shaft 64. The snapping roll shaft 58 is driven by gears 66 from the shaft 56.

Extending downwardly and rearwardly from the snapping rolls, I provide a chute-like conveyor 68. It includes conveyor shafts 70 and 72, conveyor chains 74 and conveying fingers 76 on the chains. A chain 78 serves to drive both the conveyor shaft 22 and the conveyor shaft 70 from the snapping roll shaft 58.

Referring to Figure 7, a chute 80 may be provided below the space between the conveyor shaft 22 and the snapping rolls 60 for catching the unhusked ears of corn and conducting them to a wagon or other receptacle driven along the side of the tractor. If it is desired to husk the ears of corn a bed of husking rolls 82 may be provided as shown in Figure 3.

A chute 84 is located below the husking roll bed 82 for conveying the husks to one side of the tractor. An ear corn chute 86 forms a continuation of the rolls 82 and discharges the husked ear corn into a wagon driven along side of the tractor.

The husking rolls 82 are inter-geared by means of pinions 88, whereby they are driven from each other and by means of bevel gears 90 the entire husking roll bed may be driven from the snapping roll shaft 58.

In Figure 5, I have illustrated the side frames 10a as extending considerably higher and provided with shafts 92 and 94. The shaft 94 is driven by a bevel gear connection from the drive shaft 24 and a gathering chain 96 extends around sprockets on these two shafts. Gathering fingers 98 are secured to the links of the gathering chains 96.

*Practical operation*

It will be noted that my device is made for harvesting two rows of corn at one time. The rows are indicated by the dotted line 100 in Figure 1.

The stalk cutters 44 travel in the direction of the arrows 102, so that their sharpened edges 44b engage the stalk to carry it up on to the conveyor bottom 32a. This is accomplished by making the cutter 44 rotate faster than the speed of travel of the tractor A, so that the corn stalks are conveyed upwardly butt end first. The cutters 44 normally assume a position close to the ground and are supported in such position by the caster wheels 36.

Some of the weight may be relieved from the caster wheels by adjusting the lever 42 to increase the tension of the spring 38 when it is desired to entirely raise the front end of the harvester from the ground to an inoperative position, as when traveling from one field to another. The lever 42 may be adjusted to its rearmost position.

The corn is carried upwardly by the conveyor fingers 30 and passes through the snapping rolls 60 butt end first.

The stalks with ears snapped from them are conveyed down the chute 68 into a wagon 104 pulled behind the tractor A or into a baler adapted to bale the stalks and discharge the bales so that the stalks can thus be easily transported to paper mills, etc.

The unhusked corn drops down through the space between the upper end of the elevating conveyor and the snapping rolls 60 and may be conveyed into a wagon at the side of the tractor, in either a husked or an unhusked condition depending whether the husking rolls 82 are used or not.

In the type of device shown in Figure 5 gathering fingers 98 engage the stalk of corn above where it is cut and may be adjusted for faster travel than the blade so that the stalks are conveyed top end first up the elevating conveyor. The main advantage of my device is that it can be applied to a tractor in such a way that all side draft is eliminated.

By arranging the tractor to travel over the rows of corn immediately after they are picked there is no necessity of traveling over an unpicked row to start picking in a corn field.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a corn harvester construction, an elevating conveyor, means for mounting the same on a tractor in a position directly thereabove, the forward end of said conveyor extending forwardly and downwardly from the top of the front of the tractor, cornstalk cutting mechanism at the forward end of said conveyor and snapping rolls at the rearward end thereof and positioned above the rearward end of said tractor.

2. In a corn harvester construction, an elevating conveyor, means for mounting the same on a tractor in a position directly thereabove, the forward end of said conveyor extending forwardly and downwardly from the top of the front of the tractor, cornstalk cutting mechanism at the forward end of said conveyor, snapping rolls at the rearward end thereof, means driven from the tractor for operating said conveyor, cutting mechanism and snapping rolls, and means for conveying the stalks from which the ears have been snapped, rearwardly into a receptacle independent of and pulled behind said tractor.

3. In a corn harvester construction, an elevating conveyor, means for mounting the same on a tractor in a position directly thereabove, the forward end of said conveyor extending forwardly and downwardly from the top of the front of the tractor, cornstalk cutting mechanism on said forward end, said conveyor being jointed to permit raising and lowering of said forward end thereof, caster wheels to support said forward end and snapping rolls at the rearward end thereof.

4. In a corn harvester construction, an elevating conveyor, means for mounting the same on a tractor in a position directly thereabove, the forward end of said conveyor extending forwardly and downwardly from the top of the front of the tractor, cornstalk cutting mechanism at the forward end of said conveyor and snapping rolls at the rearward end thereof, caster wheels to support said forward end and a lever and spring means for adjusting and raising said forward end of said conveyor.

5. In a corn harvester construction, an elevating conveyor, means for mounting the same on a tractor, in a position directly thereabove, the forward end of said conveyor extending forwardly and downwardly from the top of the front of the tractor, rotary blade cornstalk cutting mechanism and gathering fingers at the forward end of said conveyor and snapping rolls at the rearward end thereof.

6. In a corn harvester construction, an elevating conveyor, means for mounting the same on a tractor in a position directly thereabove, the forward end of said conveyor extending forwardly and downwardly from the top of the front of the tractor, cornstalk cutting mechanism at the forward end of said conveyor and husking and snapping rolls at the rearward end thereof and positioned above the rearward end of said tractor.

7. For use with a tractor, a corn harvester structure comprising a frame, means for securing the same to the tractor in a position thereabove, cornstalk cutting and gathering means carried by said frame, said gathering means projecting downwardly in front of the tractor and said cornstalk cutting means projecting forwardly therefrom, an elevating conveyor extending upwardly and rearwardly from said cutting and gathering means, a pair of elevated snapping rolls to receive the cornstalks from said elevating conveyor, an open space between the upper end of said elevating conveyor and said snapping rolls, and an inclined ear reception means below such open space.

8. For use with a tractor, a corn harvester structure comprising a frame, means for securing the same to the tractor in a position thereabove, cornstalk cutting and gathering means carried by said frame, said gathering means projecting downwardly in front of the tractor and said cornstalk cutting means projecting forwardly therefrom, an elevating conveyor extending upwardly and rearwardly from said cutting and gathering means, a pair of elevated snapping rolls to receive the cornstalks from said elevating conveyor, an open space between the upper end of said elevating conveyor and said snapping rolls, and an inclined ear reception means below such open space, said last means including a bed of husking rolls.

9. For use with a tractor, a corn harvester structure comprising a frame, means for securing the same to the tractor in a position thereabove, cornstalk cutting and gathering means carried by said frame, said gathering means projecting downwardly in front of the tractor and said cornstalk cutting means projecting forwardly therefrom, an elevating conveyor extending upwardly and rearwardly from said cutting and gathering means, a pair of elevated snapping rolls to receive the cornstalks from said elevating conveyor, an open space between the upper end of said elevating conveyor and said snapping rolls, an inclined ear reception means below such open space, said last means including a bed of husking rolls and a discharge chute for ears from said husking rolls.

10. For use with a tractor, a corn harvester structure comprising a frame, means for securing the same to the tractor in a position thereabove, cornstalk cutting and gathering means carried by said frame, said gathering means projecting downwardly in front of the tractor and said cornstalk cutting means projecting forwardly therefrom, an elevating conveyor extending upwardly and rearwardly from said cutting and gathering means, a pair of elevated snapping rolls to receive the cornstalks from said elevating conveyor, an open space between the upper end of said elevating conveyor and said snapping rolls, an inclined ear reception means below such open space, said last means including a bed of husking rolls and a discharge chute below said husking rolls for the husks falling through the rolls.

11. For use with a tractor, a corn harvester structure comprising a frame, means for securing the same to the tractor in a position thereabove, cornstalk cutting and gathering means carried by said frame, said gathering means projecting downwardly in front of the tractor and said cornstalk cutting means projecting forwardly therefrom, an elevating conveyor extending upwardly and rearwardly from said cutting and gathering means, a pair of elevated snapping rolls to receive the cornstalks from said elevating conveyor, an open space between the upper end of said elevating conveyor and said snapping rolls, an inclined ear reception means below such open space and a stalk delivery means extending rearwardly and downwardly from said snapping rolls.

Des Moines, Iowa, September 26, 1929.

WILLARD F. WHITAKER.